Sept. 1, 1942. H. HAMMEREN Re. 22,169
FLOATING ROOF SEAL
Original Filed Dec. 10, 1937 5 Sheets-Sheet 1
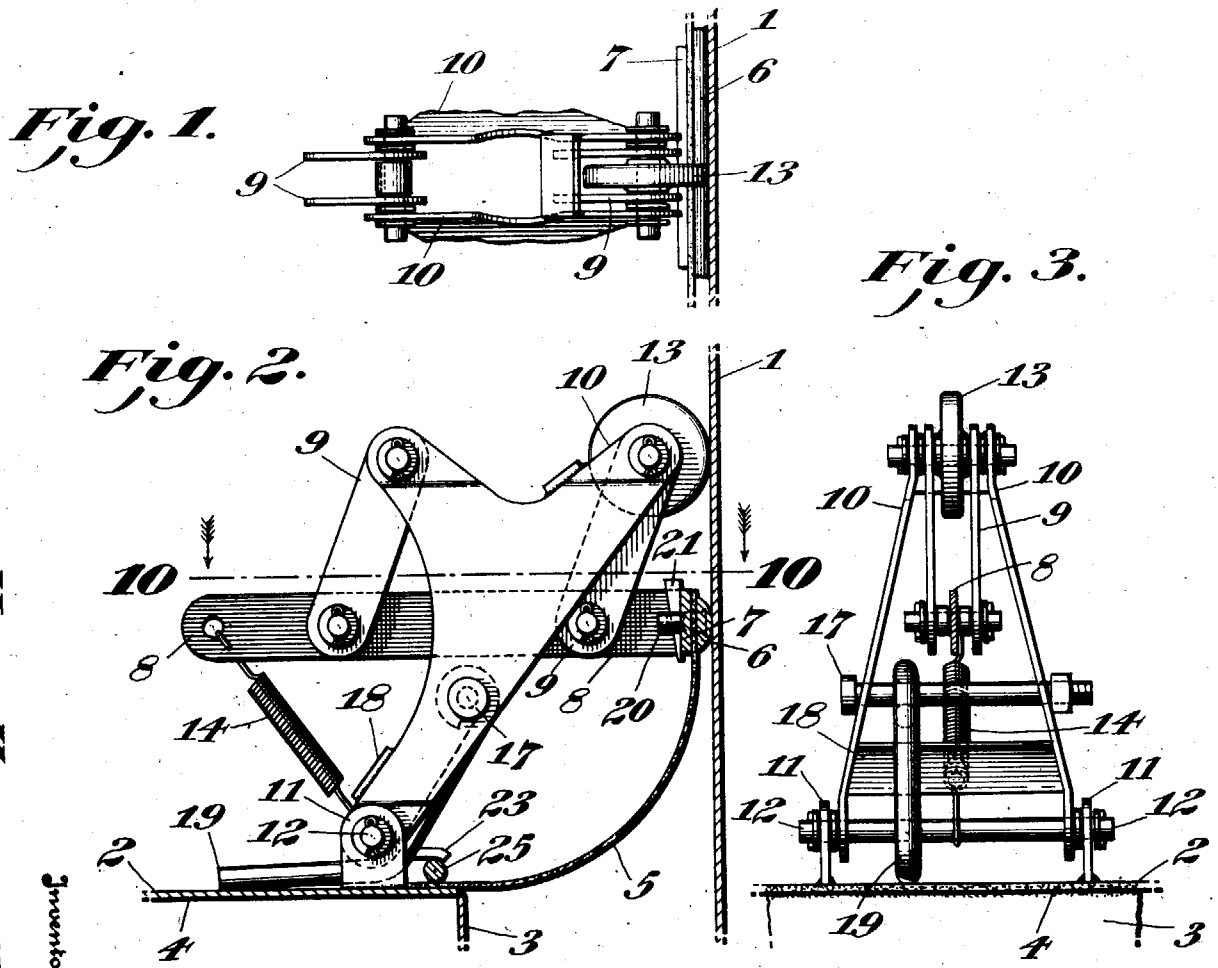
Inventor
Hans Hammeren.
By R. S. A. Dougherty.
Attorney Sept. 1, 1942. H. HAMMEREN Re. 22,169

FLOATING ROOF SEAL

Original Filed Dec. 10, 1937 5 Sheets-Sheet 2

Inventor

Hans Hammeren.

By R. S. A. Dougherty.

Attorney

Sept. 1, 1942. H. HAMMEREN Re. 22,169
FLOATING ROOF SEAL
Original Filed Dec. 10, 1937 5 Sheets-Sheet 3
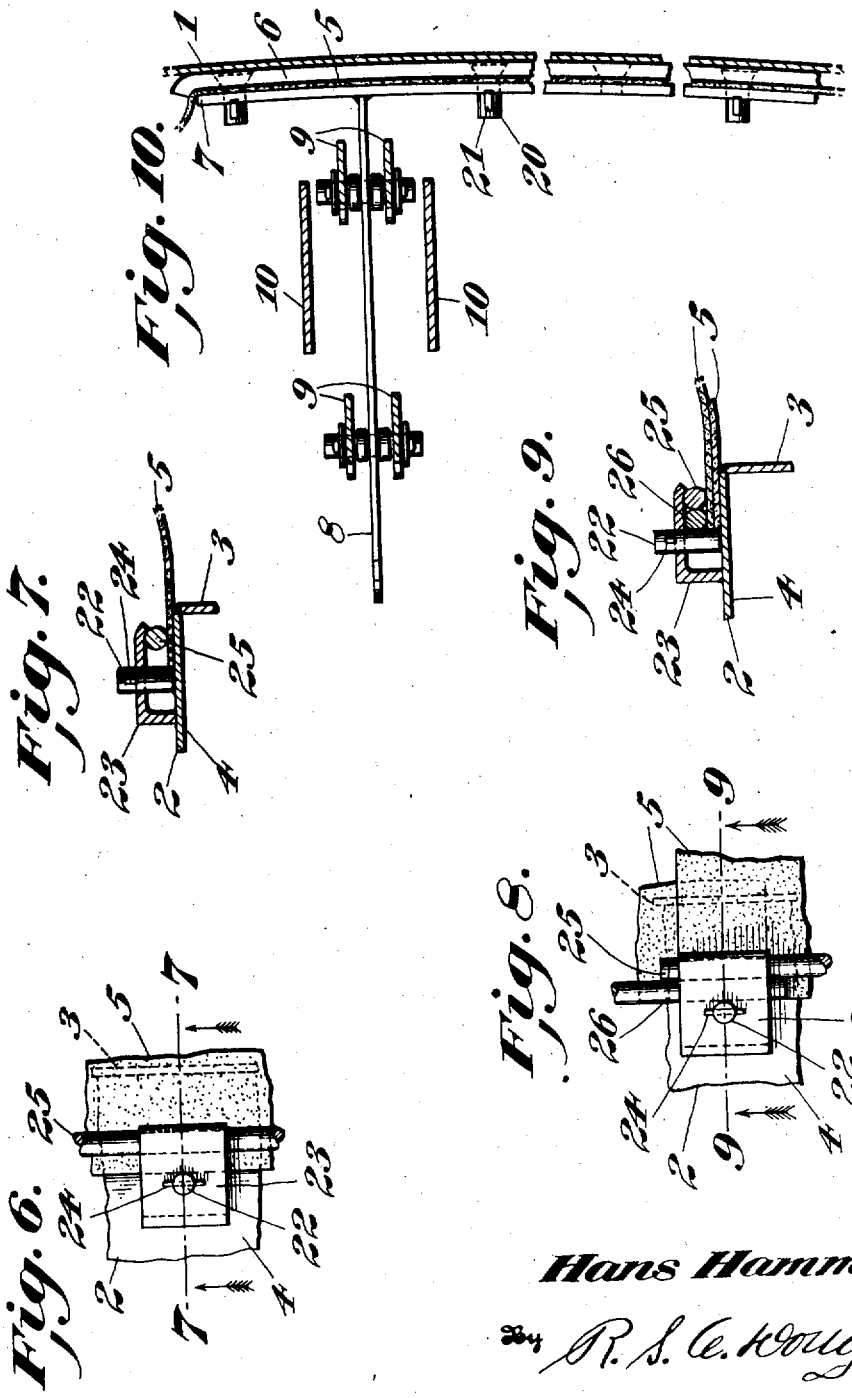
Inventor
Hans Hammeren.
By R. S. C. Dougherty
Attorney Sept. 1, 1942. H. HAMMEREN Re. 22,169

FLOATING ROOF SEAL

Original Filed Dec. 10, 1937 5 Sheets-Sheet 4

Inventor

Hans Hammeren.

By R. S. A. Dougherty.

Attorney

Sept. 1, 1942. H. HAMMEREN Re. 22,169

FLOATING ROOF SEAL

Original Filed Dec. 10, 1937 5 Sheets-Sheet 5

Inventor

Hans Hammeren.

By R. S. C. Dougherty.

Attorney

Reissued Sept. 1, 1942

Re. 22,169

UNITED STATES PATENT OFFICE 22,169

FLOATING ROOF SEAL

Hans Hammeren, Bethlehem, Pa., assignor to Bethlehem Steel Company, a corporation of Pennsylvania Original No. 2,180,587, dated November 21, 1939, Serial No. 179,050, December 10, 1937. Application for reissue November 21, 1941, Serial No. 420,037

17 Claims. (Cl. 220—26)

This invention relates to a floating roof for storage tanks used for storing volatile liquids, such as oil or gasoline.

The general object of this invention is to provide an efficient yet simple means for closing the annular space between the tank wall and the periphery of the floating roof; also to provide guiding means for preventing rotation of the roof relative to the tank, and at the same time maintaining the roof centered in the tank.

An object of this invention is to provide a flexible sealing means which is carried by the roof, and supporting means for the seal located above the seal and constructed so as to maintain contact of the seal against the tank wall effectively.

Another object is to provide a seal in which no part thereof is in contact with the liquid in the tank, thereby dispensing with sliding metallic members commonly known as shoes and the expense accompanying their manufacture and maintenance.

Other novel features will be more fully understood from the following description and claims taken with the drawings.

Referring to the drawings:

Figure 1 is a plan view of a standard hanger;

Fig. 2 is an elevation of a standard hanger;

Fig. 3 is an end view of a standard hanger with the seal removed;

Fig. 6 is a plan view of a standard seal clamp;

Fig. 7 shows a section of the seal clamp taken on line 7—7 of Fig. 6;

Fig. 8 is a plan view of a seal bar splice in way of a splice in the seal;

Fig. 9 is a sectional view taken on line 9—9 of Fig. 8;

Fig. 10 shows a section taken on line 10—10 of Fig. 2;

Figure 5:
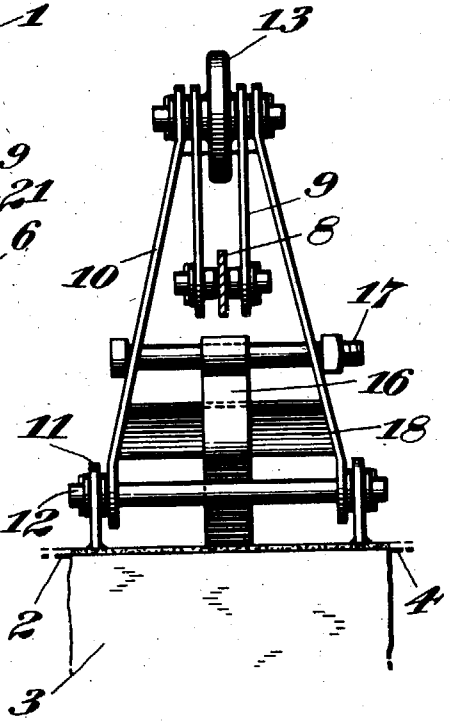
Fig. 5 is an end view of the modified hanger with the seal removed.

With reference to the parts shown in the drawings, 1 represents the side wall of a tank adapted for holding a volatile liquid. On this liquid a floating roof 2 is supported, said roof having a flat bottom portion, not shown, and provided at its edge with an upwardly extending side wall or rim 3, and top cover plate 4. However, the construction of the roof may be of any suitable design for the purpose intended.

The annular space between the wall of the tank and the side wall of said deck is substantially closed by an annular flexible seal 5 capable of adapting itself sufficiently to compensate for variations in the relative position of the roof to the tank, and for irregularities in the construction of the tank itself. The seal is made of oil and fire-resisting material. For small tanks, of about 25 feet diameter, the sealing member may be made in three sections, and larger tanks in proportion, thus reducing the number of splices in the seal to a minimum.

With a floating roof of the type illustrated, the bottom edge of the seal is secured to the top of the roof by special clamping means, hereinafter to be described, so as to form a tight joint between the seal member and the roof. The seal is curved upwardly and outwardly toward the wall of the tank but is protected at its upper edge from rubbing against the tank by means of the circular contact bars 6. These bars are preferably made in sections of shorter lengths than the lengths of the seal sectors. The bars 6 may consist of either ferrous or non-ferrous half ovals so as to ride over joints and rivets of the tank, and are comparatively stiff so as to maintain the top edge of the seal substantially circular at all times.

The seal is supported at its upper edge by means of circular carrier bars 7 and horizontal swingingly mounted supporting members 8, the supporting members being welded at their outside ends to the carrier bars. To said swinging members are pivotally attached two pairs of links 9 which in turn are pivotally attached at their upper ends to supporting brackets 10. Two similar brackets 10 are provided for each supporting unit so as to form a firm and non-tiltable support for the seal. The brackets have a wide top portion presenting the appearance of an inclined Y and are pivotally connected at their lower ends to the deck by means of lugs 11 and pins 12. The lower ends of the brackets are spaced apart a greater distance than their upper ends so as to provide a firm support for the seal and to resist lateral bending.

All seal supporting brackets as shown in Figs. 1 to 5 are provided at their outer ends with rollers 13, preferably non-ferrous, for guiding the brackets over seams and rivets of the tank.

With a sealing unit in its normal position, as shown in the drawings, the links 9 stand in a downwardly and inwardly inclined position so that the horizontal weight component of the sealing member and its related parts tend to press the contact bar 6 against the tank wall under all conditions, but allow relative movement between the supporting bar 8 and brackets 10. In addition to the weight component for effecting contact between bar 6 and the tank wall, a coil spring 14 may be used to advantage to aid in keeping the bar 6 in contact with the tank wall, or a weight attached to bar 8 would have an equivalent effect.

Each unit as shown in Figs. 1, 2 and 3 is preferably provided with a stop bar 19 so as to limit the inward movement of the rollers relative to the roof to about 1½″. This bar, however, will not prevent the outward movement of the rollers. These stop bars also assist in maintaining the roof positioned centrally of the tank.

The sealing member 5, contact bar 6 and carrier bar 7 are attached to each other by means of slotted rivets 20 passing through each of said pieces and fastened together by means of tapered keys 21 driven through the slot of the rivet. This attachment provides an easy and quick way for assembling or disassembling these parts without the use of bolts and nuts which are subject to corrosion. A fastening of this type provides a positive connection for the three above mentioned pieces, and does not rely upon a friction connection for supporting the upper edge of the sealing member.

Figure 4:
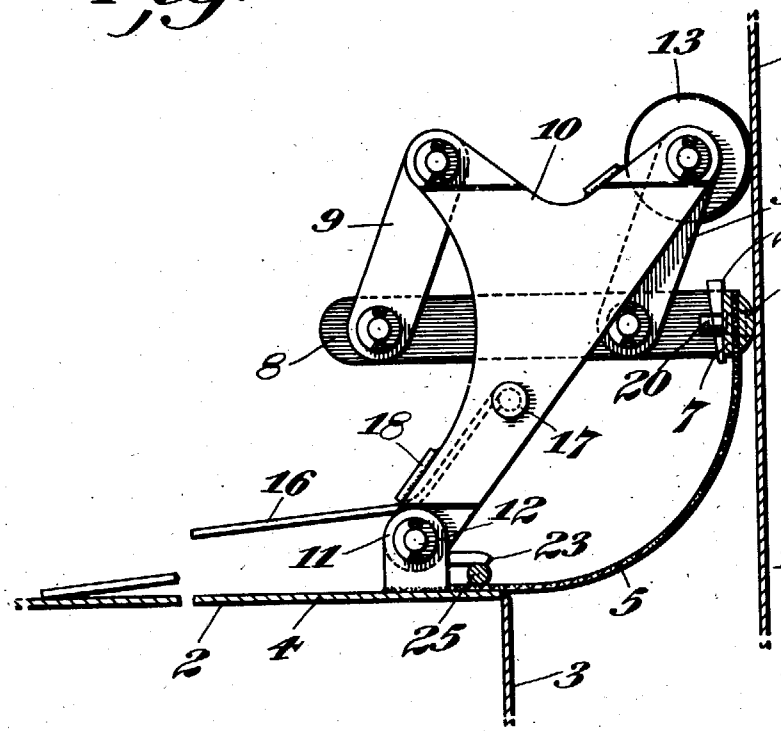
Fig. 4 is an elevation of a modified hanger.

The supporting bracket as shown in Figs. 4 and 5 is similar to the bracket shown in Figs. 1 to 3 with the exception that the end of the supporting member 8 is cut off and spring 14 omitted. This bracket is provided with a leaf spring 16 attached at its upper end to bolt 17 and shaped so as to bear against bar 18 at its lower edge and then incline downwardly to contact the top of the roof at its lower end. When in its assembled position the spring will exert force tending to press the roller 13 against the wall of the tank. This particular bracket with spring 16 is intended to be used at the side of the roof opposite the roller guide bracket shown in Figs. 14 and 15 for keeping the roof central relative to the tank. Any number, or all, of the brackets may be equipped with springs, if desired, in this manner to increase the sealing pressure against the tank shell.

Figs. 6 to 9 show clamps for securing the seal member to the deck in a convenient manner. The clamps shown in Figs. 6 and 7 are used intermediate the joints in bar 25 and are also used at the splices in the seal, and consist of a stud 22 welded to the deck, a clip 23 and a tapered key 24 for clamping the continuous bars 25 against the seal. The clamps as shown in Figs. 8 and 9 are similar in all respects to those shown in Figs. 6 and 7 except they indicate the means for splicing the hold-down bars 25 and 26. Splices in the seal 5 are made by lapping the material under one of the clamps as indicated in Figs. 8 and 9.

Figure 11:
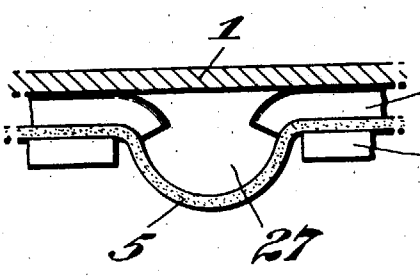
Fig. 11 is a sectional plan at the ends of the contact bars.

Fig. 11 shows the manner of carrying the seal over the ends of the contact bars 6. The seal is arched at these points so as to provide expansion of the seal due to shift of the roof relative to the tank and to allow for independent movement of the various sections of the seal relative to each other.

Figure 12:
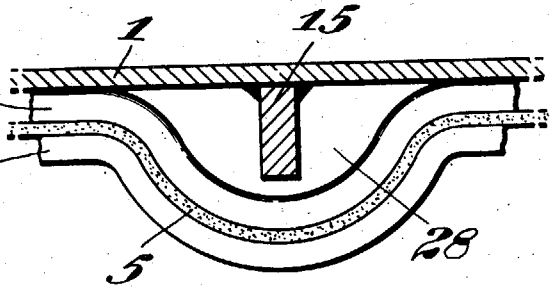
Fig. 12 is a sectional plan of the seal in the way of the guide rail.

Fig. 12 shows the manner of bridging the seal over the guide rail 15. Here, the contact bar 6, the seal 5 and the carrier bar 7 are made continuous in passing over the rail. The small open spaces 27 and 28 prevent formation of pressure in the gases accumulating under the seal between the side of the roof and the wall of the tank.

Figure 13:
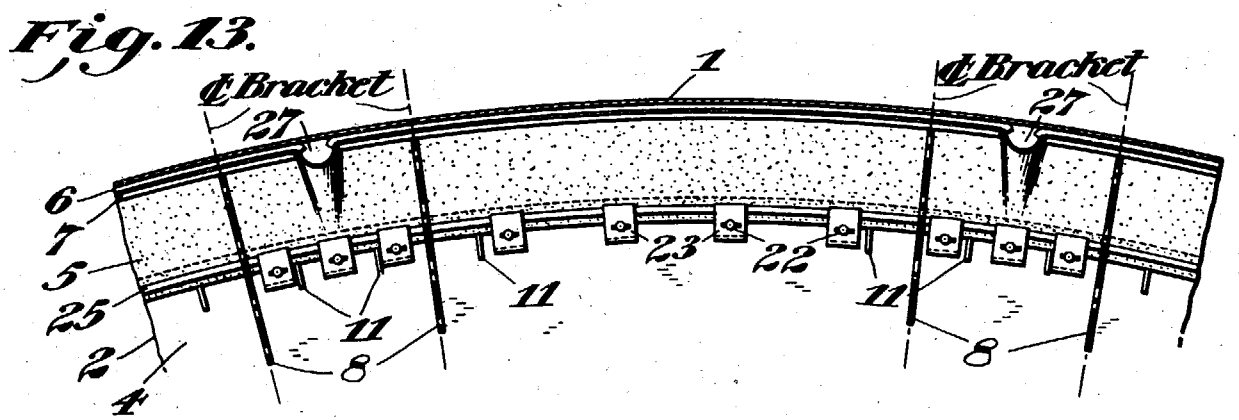
Fig. 13 shows a partial plan view of a section of the seal.

Fig. 13 is a plan view of a section of the seal and shows the relation of the supporting brackets to the ends of the contact and carrier bars as illustrated in Fig. 11. It will be noted that there are two supporting brackets for each section of these bars for effectively supporting the ends of these pieces and thereby supporting the upper edge of the seal throughout its circumference. However, for large tanks, a single bracket assembly having two bars 8, spaced apart, may be used for supporting the opposing ends of bars 7, thus reducing the number of brackets required.

Figures 14, 15:
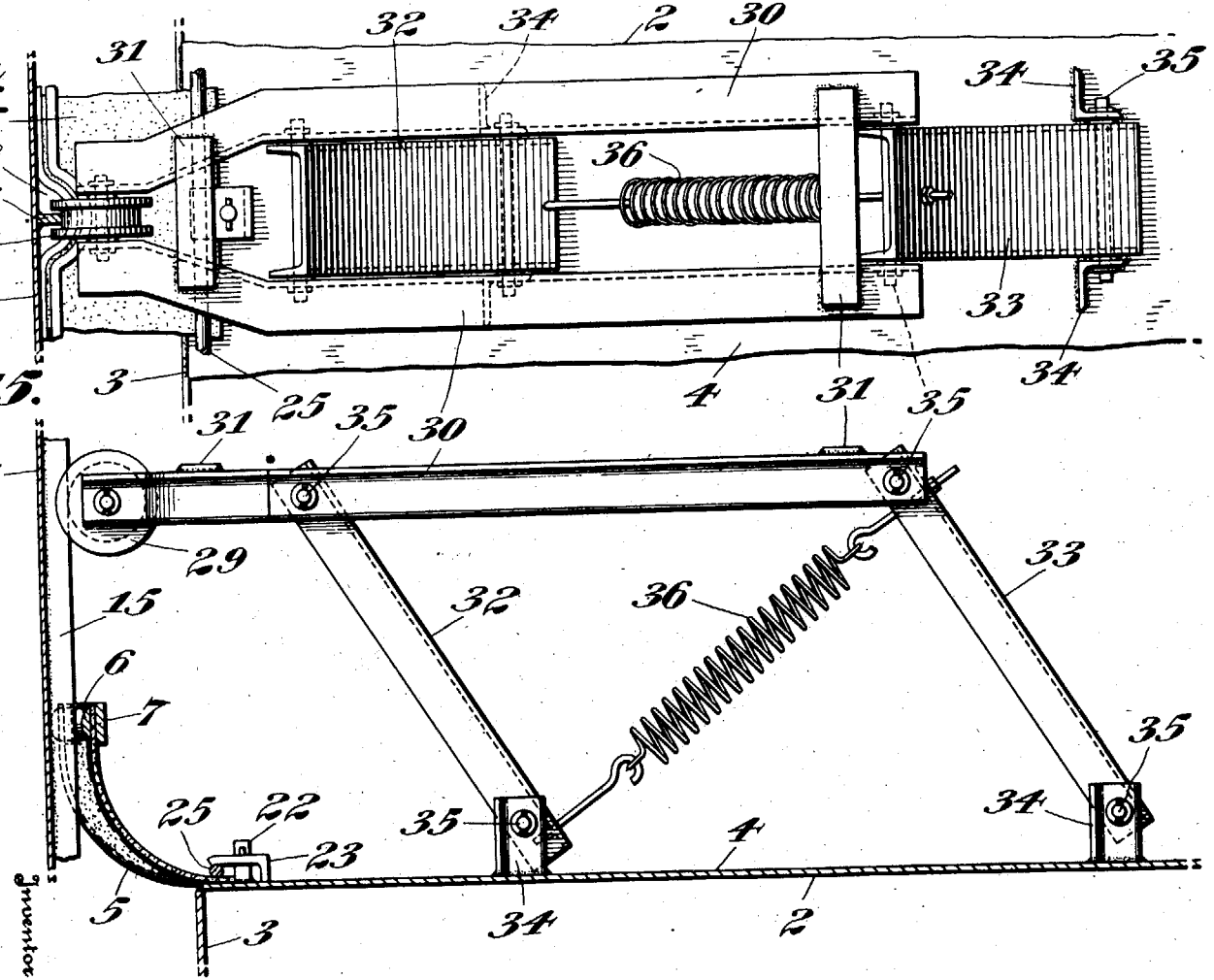
Fig. 14 is a plan view of a roller guide bracket.
Fig. 15 is an elevation view of the guide bracket.

Figs. 14 and 15 show the construction of a roller guide bracket for preventing turning of the roof relative to the tank. Each bracket has a grooved roller 29 mounted between the ends of two horizontally positioned angles 30 held in spaced relation by means of plates 31 welded to the angles adjacent their ends. The angles thus assembled form a supporting arm for the roller. The arm is pivotally connected to the top of the roof by means of two parallel inclined links 32, 33 and pivotal supports 34 welded to the roof. The links are made from standard channel sections which provide spaced bearings for the pins 35 forming the pivots. An adjustable tension spring 36 is attached to the lower end of link 32 and to the upper end of link 33 for exerting pressure on the roller against rail 15 so as to prevent disengagement between the roller and the rail. The rail is of rectangular section and is welded to the inside of the tank at its outside edge.

In view of the necessity for maintaining the roof in its proper position with respect to stairways, ladders, gauge hatches, etc., it is essential that horizontal movement of the roof be prevented. A single guide rail will suffice for storage tanks of comparatively small diameter, but it is advisable to use two or more rails and guide-brackets for large tanks.

The counteraction of spring 16 on the bracket shown in Fig. 4 against spring 36 of the roller guide of Fig. 15 produces an automatic centering of the roof relative to the tank should the roof deviate from its concentric position in the tank.

It will be noted that the seal and all of its supporting parts, and the roller guide bracket, are mounted in the open where all the parts are accessible and free from direct contact with the liquid in the tank and its corrosive influence.

A feature of a seal constructed in this manner is its comparative light weight and low cost, in combination with its proven practicability and accessibility in service.

Having thus described my invention what I claim as new and desire to secure by Letters Patent is:

1. The combination with a liquid storage tank and a floating roof therefor, of a flexible sealing member secured at one edge of the roof for closing the annular space between the edge of the roof and the tank, a contact bar secured to the free edge of the sealing member adjacent the wall of the tank, a carrier bar for the free edge of the seal, a supporting member attached to said carrier bar, an upwardly projecting bracket hinged at its lower end to the roof and having a bearing at its upper end for contact with the wall of the tank, and links pivotally attached to said bracket and to said supporting member so as to maintain said supporting member in horizontal swinging position.

2. A seal for closing the annular space between the walls of a liquid storage tank and the edge of a roof adapted to float upon liquid in the tank, comprising an outwardly projecting flexible sealing member secured to the roof for bridging said space, a rounded contact bar for the projecting edge of the fabric adjacent said wall, a carrier bar for the projecting edge of the fabric, means for clamping said fabric and contact bar to said carrier, a horizontally disposed supporting bar secured to said carrier bar, an upwardly projecting bracket hinged at its lower end to the roof and having a roller at its upper end for bearing against the tank wall, spaced supporting links pivotally attached to said bracket and to said supporting bar for holding said bar in substantially horizontal swinging position relative to the roof; said contact bar, sealing member and its supporting parts being located entirely above the top of said roof and free of contact with the liquid in the tank.

3. A seal for closing the annular space between the walls of a liquid storage tank and a roof adapted to float upon the liquid in the tank, comprising a flexible sealing member secured to the edge of the roof and constituting substantially the sole means for closing said space, a carrier bar to which the upper free edge of said sealing member is attached, an inwardly projecting supporting bar attached at its outer end to said carrier, bracket members forming a unit hinged at their lower ends to the top of the roof and having a bearing at their upper ends for contact with the tank wall, said supporting bar being swingingly suspended from said bracket members by means of links pivotally attached at their upper ends to said brackets and to said supporting member at their lower ends, said pivots being at equally spaced points on said brackets and said support, the lower ends of said links being inwardly offset an appreciable amount relative to their upper ends when in their normal operative position.

4. A seal for closing the annular space between the walls of a liquid storage tank and the edge of a roof adapted to float upon the liquid in the tank, comprising an upwardly curved strip of flexible fabric secured at one edge to the roof and providing substantially the sole means for effecting a closure between the edge of the roof and the tank, means for preventing rubbing of the free edge of said fabric against the tank, a circular carrier bar for supporting the free edge of the fabric, a horizontally disposed swinging member attached to said carrier, an outwardly inclined bracket hinged at its lower end to the roof and having a bearing at its upper end for contact with the inside wall of the tank, and a plurality of depending links spaced a substantial distance apart pivotally connecting said swinging member to said bracket, said links being vertically inclined when in their normal operative position so that the horizontal weight component of the parts suspended from said bracket will tend to force said swinging member outwardly and thereby urge the free edge of the fabric strip toward the wall of the tank.

5. A seal of the kind described in claim 4, and a force producing means acting upon said swinging member in addition to said weight component for assisting in urging the free edge of the fabric strip toward the wall of the tank.

6. A seal for floating tank roofs having an upwardly curved annular sealing member secured at its lower edge to the roof for closing the space between the edge of the roof and the tank, means for supporting the upper edge of the sealing member comprising a bracket hinged at its lower end to the roof and having a widened top portion carrying a roller for contact with the tank wall, said widened portion having depending links pivoted thereto at their upper ends and pivotally connected at their lower ends to a swingingly mounted supporting member connected to the top edge of the sealing member, said links being spaced apart sufficiently so as to hold said supporting member in substantially horizontal position, and means limiting the inward movement of said bracket about its hinge for restricting the horizontal movement of the roof relative to the tank.

7. A seal for closing the annular space between the walls of a liquid storage tank and a roof adapted to float upon the liquid in the tank, comprising an upwardly curved sealing member secured at its lower edge to the top edge of the roof for closing said space, a rounded contact bar secured to the outside upper edge of the sealing member for engagement with the wall of the tank, a carrier bar secured to the inside upper edge of the sealing member, an inwardly projecting supporting member rigidly secured at one of its ends to said carrier bar, a Y-shaped bracket hinged at its lower end to the top of the roof near its edge and having a roller at its outside upper extension for contact with a portion of the tank, a pair of links pivotally suspended from the outside upper extension of said bracket, another pair of links pivotally suspended from the inside upper extension of said bracket, the lower ends of said links being inwardly offset relative to their upper ends when in operative position and pivotally connected to said supporting member at points equally distant relative to their upper ends.

8. The combination with a liquid storage tank and a floating roof therefor, of an upwardly curved fabric seal secured at one edge to the roof and adapted to close the annular space between the edge of the roof and the wall of the tank, a protective rubbing strip for the free edge of the seal and of less depth than the height of the seal, a shallow carrier bar for attaching the free edge of the seal thereto, a supporting bar rigidly attached to said carrier, a vertically projecting bracket hinged at its lower end to the top of the roof and having its upper end portion inclined toward the tank wall and in rolling contact therewith, two sets of equally spaced links pivotally connected to the upper end of said bracket and to said supporting bar, said links being vertically inclined when in their operative position so that the horizontal weight component of the parts carried by said bracket will urge the free edge of the seal into pressing engagement with the wall of the tank, said fabric constituting substantially the sole means for retarding evaporation of the liquid exposed in said space when the roof is floated in the tank.

9. The combination of a liquid storage tank, a floating roof for said tank, and a seal for said roof comprising a flexible sealing member secured at its inner edge to the roof and having its outer free edge positioned adjacent the wall of the tank, means secured to the free edge of said sealing member for preventing rubbing of the seal against the tank, a ring sector for supporting and maintaining said free edge substantially circular, an inwardly projecting bar fixedly attached to said ring, an upwardly projecting bracket hinged at its lower end to the roof and having a roller at its upper end for rolling contact against the tank wall, a link pivotally attached at its upper end to said bracket at the axis of said roller, another similar link pivotally attached at its upper end to said bracket in spaced relation to the first mentioned link, the lower ends of said links being pivotally attached to said bar at points equally spaced relative to their upper ends for maintaining said bar in substantially horizontal swinging position relative to the roof.

10. A seal for floating roof tanks, comprising an outwardly projecting sealing member secured to the roof for closing the annular space between the edge of the roof and the tank wall, a circular protective member attached to the projecting edge of the sealing member adjacent the tank wall, a supporting bar rigidly attached to said protective member and to the projecting edge of said sealing member, a bracket carried by the roof for supporting said supporting bar, a plurality of spaced links pivotally attached to said bracket and to said supporting bar for maintaining said bar in horizontal swinging position and thereby prevent said protective member and the projecting edge of the sealing member from turning when passing over projections on the wall of the tank, said links being vertically inclined so that the horizontal weight component of the parts carried by said bracket will urge the protective member into pressing engagement with the wall of the tank.

11. A seal for floating tank roofs, comprising an upwardly inclined seal supporting brackets hinged at its lower end to the roof and carrying a roller at its upper end for engagement with the wall of the tank, an upwardly curved flexible member secured at its lower edge to the roof for closing the annular space between the roof and the inside of the tank, a carrier member for the upper free edge of the flexible member, a horizontally disposed supporting member fixedly attached to said carrier, spaced sets of links pivotally connecting said supporting member to said bracket, and a spring coacting between said bracket and a portion of the roof for pressing said roller against the wall of the tank.

12. The combination with a seal for floating tank roofs of the kind described in claim 11, of a vertical guide rail fixed to the inside of the tank, and a roller yieldingly mounted on the top of the roof and at the side opposite said supporting bracket for engagement with said rail.

13. In a floating roof for tanks the combination with a bracket pivotally mounted on the roof and having end engagement with the tank for supporting the edge of an annular sealing member, a spring combined with the bracket and the roof for exerting pressure on the bracket against the tank, of a guide rail fixed to the inside of the tank, a guide roller yieldingly mounted on the roof at the side opposite said supporting bracket by means of a horizontal arm carrying said roller, a pair of links pivotally connecting said arm with the deck, and a spring connecting said links for maintaining said roller in contact with the rail, the counteraction of the springs associated with said supporting bracket and said links being effective for maintaining the roof central relative to the tank.

14. The combination with a liquid storage tank and a floating roof therefor, of a flexible sealing member secured at one edge to the roof for closing the annular space between the edge of the roof and the tank, a contact bar secured to the free edge of the sealing member adjacent the wall of the tank, a carrier bar for the free edge of the seal, a supporting member attached to said carrier bar, upwardly projecting brackets hinged at their lower ends to the roof and having a bearing at their upper ends for contact with the wall of the tank, and links pivotally attached to said brackets and to said supporting member so as to maintain said supporting member in horizontal swinging position.

15. The combination with a liquid storage tank and a floating roof therefor of a flexible sealing member secured at one edge to the roof for closing the annular space between the edge of the roof and the tank, a carrier bar for the free edge of the seal, supporting members attached to said carrier bar, upwardly projecting brackets hinged at their lower ends to the roof and having a bearing at their upper ends for contact with the wall of the tank, and links pivotally attached to said brackets and to said supporting members so as to maintain said supporting members in horizontal swinging position.

16. A seal for closing the space between the walls of a liquid storage tank and the edge of a roof adapted to float upon the liquid in the tank, comprising a flexible sealing member secured at one edge to the roof for closing said space, a carrier bar for the free edge of the seal, a supporting member attached to said carrier bar, an upwardly projecting bracket hinged at its lower end to the roof and having a bearing at its upper end for contact with the wall of the tank and a link pivotally attached to said bracket and to said supporting member so as to maintain the supporting member in horizontal swinging position.

17. A seal for closing the space between the wall of a liquid storage tank and the edge of a roof adapted to be movably supported in the tank, comprising a sealing member secured at one edge to the roof, a bracket hinged to the roof and having a bearing member adapted to contact said wall, means to urge said bearing member into contact with said wall, a member movably mounted on said bracket for supporting said sealing member, and means to urge the last mentioned movable member into contact with said wall independently of said bearing member.

HANS HAMMEREN.